United States Patent [19]

Caray

[11] 4,450,945
[45] May 29, 1984

[54] DIAPHRAGM CLUTCH COVER ASSEMBLY

[75] Inventor: André Caray, Paris, France

[73] Assignee: VALEO, Paris, France

[21] Appl. No.: 313,266

[22] Filed: Oct. 21, 1981

[30] Foreign Application Priority Data

Oct. 22, 1980 [FR] France ............................ 80 22545

[51] Int. Cl.³ ............................................ F16D 13/44
[52] U.S. Cl. .............................. 192/89 B; 192/70.27
[58] Field of Search ........................... 192/89 B, 70.27

[56] References Cited

U.S. PATENT DOCUMENTS

| 2,211,192 | 8/1940 | Wolfain | 192/68 |
| 4,084,674 | 4/1978 | de Gennes | 192/89 B |
| 4,211,315 | 7/1980 | Fenart | 192/89 B X |
| 4,214,653 | 7/1980 | Slack | 192/89 B X |
| 4,254,853 | 3/1981 | Huber | 192/70.27 |
| 4,273,328 | 6/1981 | Huber | 192/89 B |
| 4,326,611 | 4/1982 | Billet | 192/70.27 X |

FOREIGN PATENT DOCUMENTS

| 2306255 | 2/1973 | Fed. Rep. of Germany | 192/89 B |
| 2843337 | 10/1978 | Fed. Rep. of Germany | 192/89 B |
| 2906863 | 2/1979 | Fed. Rep. of Germany | 192/89 B |
| 7428403 | 3/1976 | France . | |

Primary Examiner—Rodney H. Bonck
Assistant Examiner—James J. Merek
Attorney, Agent, or Firm—Charles E. Brown

[57] ABSTRACT

A diaphragm clutch cover assembly comprising a cover, a diaphragm spring, a fulcrum ring on the side of the diaphragm spring remote from the cover and connecting members interconnecting the cover and the fulcrum ring. The connecting members each comprise an integral boss on one or both of the cover and the fulcrum ring extending axially toward the other of the cover and the fulcrum ring. The bosses may comprise dimples with a front wall bonded or riveted to a flat wall portion of the other of the cover and the fulcrum ring. Alternatively, the bosses may be tubular with internal apertures which are force-fitted or bonded to studs or complementary tubular bosses on the other of the cover and the fulcrum ring. Preferably, the connecting members are arranged axially within mean transverse planes through planar portions of the cover and fulcrum ring respectively.

19 Claims, 12 Drawing Figures

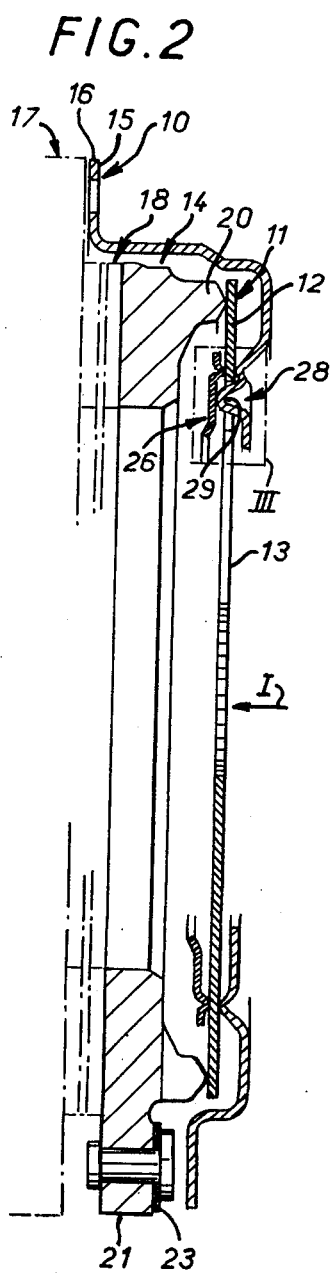
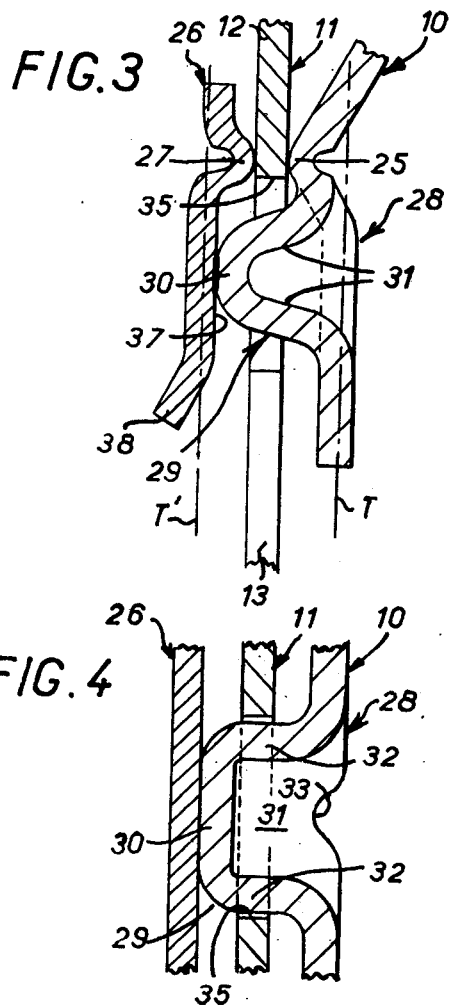
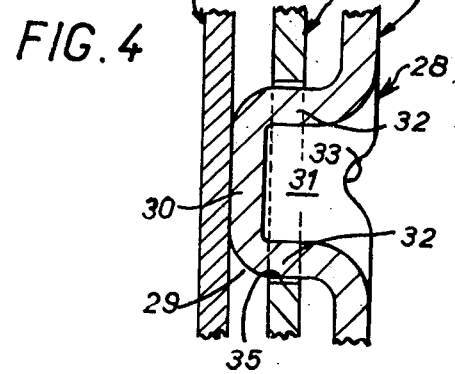
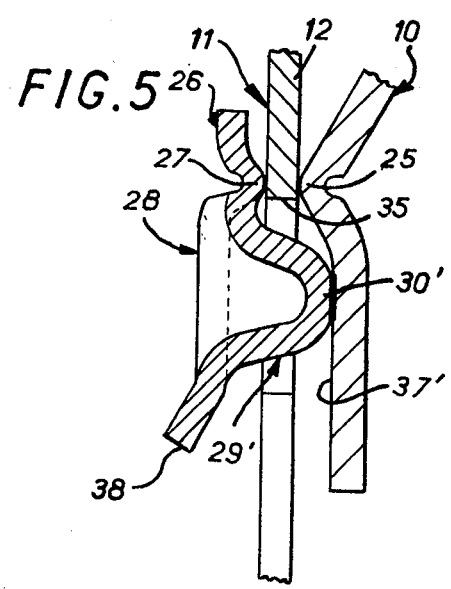

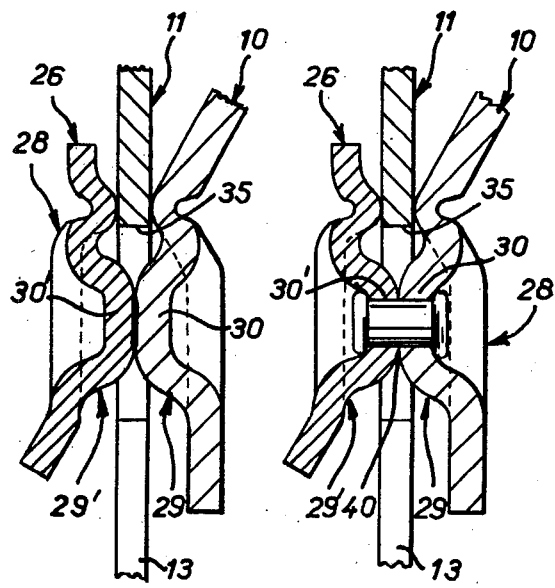
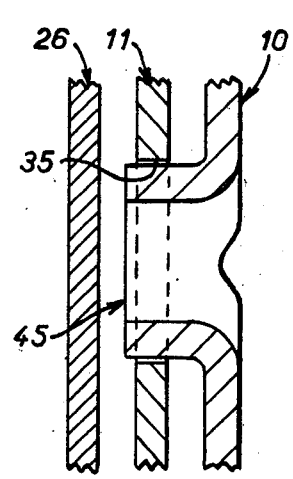
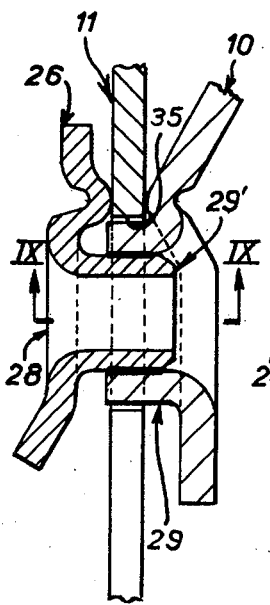
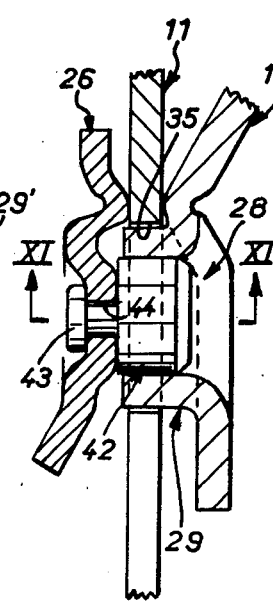
FIG. 6  FIG. 7  FIG. 12
FIG. 8  FIG. 9  FIG. 10  FIG. 11

DIAPHRAGM CLUTCH COVER ASSEMBLY

BACKGROUND OF THE INVENTION

The present invention relates generally to diaphragm clutch cover assemblies, particularly for motor vehicles, of the type comprising a cover, a diaphragm spring having a Belleville washer peripheral portion and a central portion divided into radial fingers by radial slots, assembly means for rockably mounting the diaphragm spring on the cover, a pressure plate fixed for rotation with the axially movable with respect to the cover, the Belleville washer peripheral portion of the diaphragm spring bearing against the pressure plate.

In such arrangements the cover, diaphragm spring and pressure plate respectively define first, second and third annular members.

The cover of such a cover assembly is adapted to be mounted on a reaction plate or flywheel fixed for rotation with a first shaft, generally the driving shaft, with a clutch plate or driven disk fixed for rotation with a second shaft, generally a driven shaft, disposed axially between the reaction plate and the pressure plate. A clutch release bearing is disposed around the second shaft and is cooperable with the radial fingers of the diaphragm spring for disengaging the clutch which is normally engaged; normally the pressure plate grips the clutch plate against the reaction plate under the bias of the Belleville washer peripheral portion of the diaphragm spring.

The present invention relates more particularly to such cover assemblies in which the assembly means for rockably mounting the diaphragm spring on the cover comprise a fourth annular member called a fulcrum ring which is disposed on the side of the diaphragm spring remote from the cover and attached thereto by connecting members.

The cover provides a first or primary fulcrum itself or through the intermediary of another ring and the fulcrum ring provides the second or secondary fulcrum either directly or through the medium of still another ring.

PRIOR ART

One of the problems posed by the manufacture of diaphragm type clutch cover assemblies involves the fabrication of the connecting members necessary for attaching the fulcrum ring to the cover.

In some constructions (see U.S. Pat. No. 2,211,192), the fulcrum ring has integral lugs or tabs which extend axially through the diaphragm spring and axially beyond the spaced enclosed by the means transverse planes defined by the fulcrum ring and the cover, and which are welded to a cylindrical collar at the inner periphery of the cover.

The presence of this cylindrical collar protruding outwardly from the cover is of not insubstantial axial length on account of the surface necessary for welding and for the connecting fillet between the surface and the mean transverse plane of the cover which must substantially increase the axial dimension of the resulting clutch which may be incompatible with certain uses.

Moreover, the presence of tabs or lugs along the inner periphery of the cover can only reduce the rigidity of the latter which is detrimental to the satisfactory operation of the clutch.

In other constructions (see for example French printed patent application No. 2,282,572), the cover and the fulcrum ring are connected to each other by axially extending pins or rivets which are fixed at their ends by upsetting over the cover and the fulcrum ring respectively.

Although this arrangement has given satisfaction it has various drawbacks which are, on the one hand, the need to rivet during assembly of the cover assembly since the pins or rivets are previously secured to the cover or to the fulcrum ring, and on the ohter hand, the presence of rivet heads projecting beyond the mean transverse planes which for certain uses makes the accommodation of the cover assembly difficult.

Finally, in still other constructions (see, e.g., U.S. Pat. No. 4,084,674), the fulcrum ring is attached to the cover by a plurality of tab or lug connecting members which are integrally formed with the cover or the fulcrum ring or formed on or associated with separate members bearing axially against the cover or the fulcrum ring; at the free end of each lug or tab connecting members is formed a right-angle bend which defines an axial support for the fulcrum ring or bears axially against the cover.

Even though such an arrangement has given satisfaction it has the drawback of requiring a folding or bending of the connecting members during assembly to form the right-angle bends in the tab or lug connecting members, whereby the cover assembly cannot be assembled by simply stacking the various components but requires special tooling.

OBJECT AND SUMMARY OF THE INVENTION

An object of the invention is to provide such a cover assembly which minimizes the drawbacks of these prior art arrangements.

Another object is to provide such a cover assembly in which the connecting means are defined by bosses.

According to the invention there is provided a diaphragm clutch cover assembly of the type including an annular cover for mounting on a reaction plate or flywheel, a diaphragm spring having a Belleville washer peripheral portion and a central portion divided by slots into radial fingers, assembly means for rockably mounting the diaphragm spring on the cover, a pressure plate fixed for rotation with and axially movable relative to the cover, the Belleville washer peripheral portion bearing against the pressure plate, the assembly means comprising a fulcrum ring disposed on the side of the diaphragm spring remote from the cover and attached thereto by a plurality of connecting members. The novel cover assembly is characterized by said connecting members comprising bosses on at least a selected one of the cover and the fulcrum ring, the bosses projecting axially toward the nonselected one of the cover and the fulcrum ring.

Such bosses form dimples or depressions or are tubular with internal apertures.

The bosses may bear directly against the nonselected one of the cover and the fulcrum ring. The nonselected one of the cover and the fulcrum ring may comprise other bosses cooperable with the first-mentioned bosses for fixing the fulcrum ring to the cover. The other bosses may be integral with the nonselected one of the cover and fulcrum ring and a form dimples or depressions or are tubular with internal apertures. Alternatively, studs may be provided on the nonselected one of the cover and fulcrum ring cooperable with the first-mentioned bosses for fixing the fulcrum ring to the cover. In this case the connecting members thus formed between the fulcrum ring and the cover are advantageously entirely disposed axially between the mean transverse planes of the cover and fulcrum ring, respectively, without protruding beyond the internal space defined therebetween.

Alternatively, studs may be provided on the nonselected one of the cover and the fulcrum ring cooperable with the first-mentioned bosses for fixing the fulcrum ring to the cover. In this case the studs are riveted to the nonselected one of the cover and the fulcrum ring, but the heads of the rivets do not project axially beyond the immediately surrounding area of the nonselected one of the cover and the fulcrum ring.

In any event the fulcrum ring is advantageously devoid of tabs or lugs at its inner periphery and therefore has good rigidity and the cover assembly may be assembled without any simultaneous bending or folding operations.

BRIEF DESCRIPTION OF THE DRAWINGS

FIG. 2 is a longitudinal sectional view taken on broken line II—II in FIG. 1;

FIG. 3 is a detail, on the enlarged scale, of the portion of the cover assembly included within the phantom line box III in FIG. 2;

FIG. 4 is a detail, on an enlarged scale, of the cover assembly taken on a chord IV-13 IV in FIG. 1;

FIGS. 5, 6 and 7 are views similar to that of FIG. 3 relative to three other embodiments;

FIG. 8 is also a view similar to that of FIG. 3 for yet another embodiment;

FIG. 9 is a view similar to FIG. 4 for the embodiment of FIG. 8;

FIGS. 10 and 11 are views of still another embodiment corresponding to FIGS. 8 and 9; and FIG. 12 is a sectional view similar to FIG. 4 for still another embodiment.

DETAILED DESCRIPTION OF THE PREFERRED EMBODIMENTS

Figure 1:
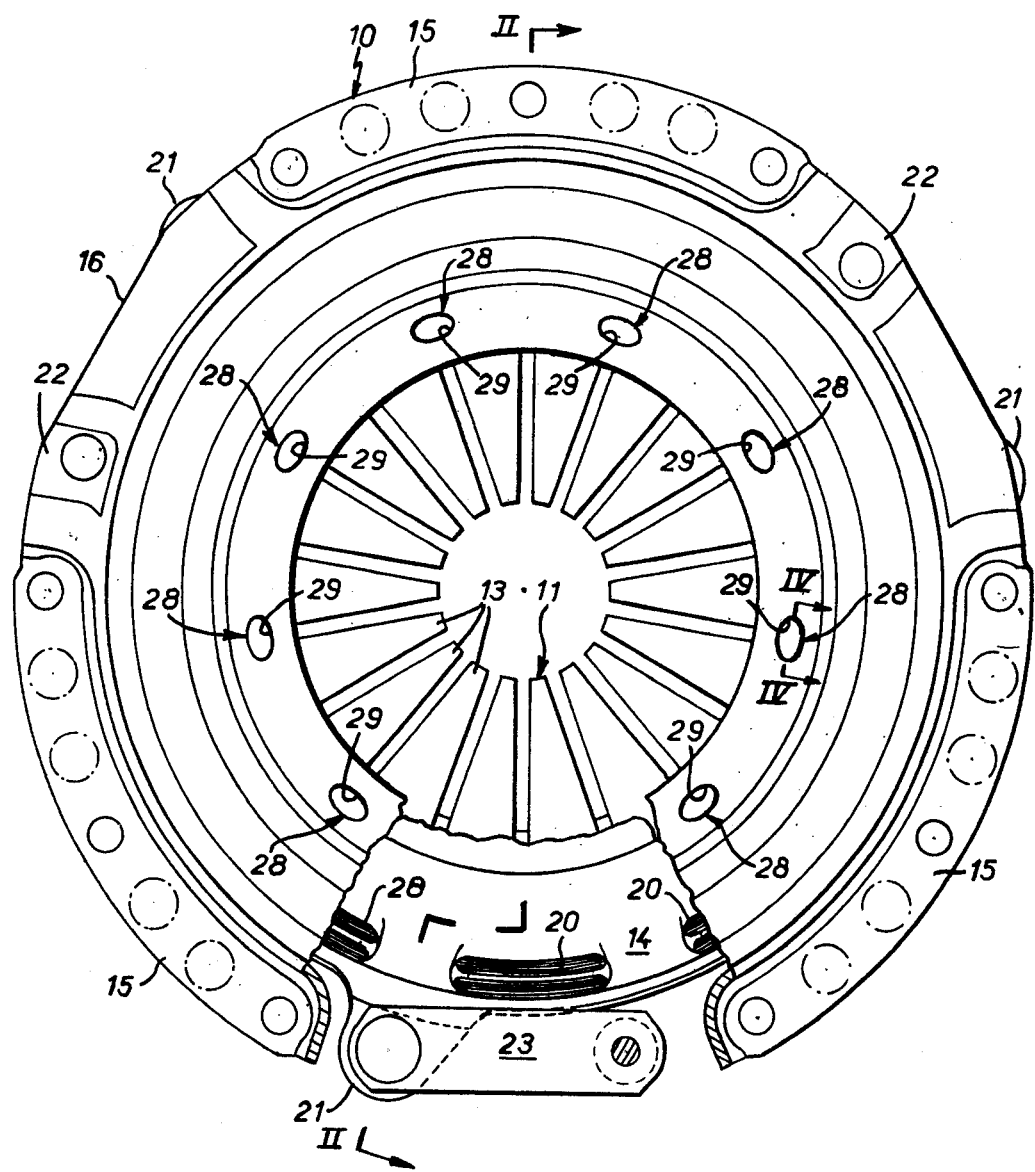
FIG. 1 is an elevational view taken in the direction I in a FIG. 2, with portions cut away, of a diaphragm clutch cover assembly embodying the invention.

Various features and advantages of the invention will now be brought out in the description which follows with reference to the accompanying drawings.

According to all the embodiments the diaphragm clutch cover assembly according to the invention comprises a first generally annular member or cover 10, a second generally annular member or diaphragm spring 11 having a Belleville washer peripheral portion 12 and a central portion divided into radial fingers 13 by radial slots, assembly means rockably mounting the diaphragm spring 11 on the cover 10 described in greater detail below, and a third annular member or pressure plate 14 fixed for rotation with and axially movable with respect to the cover 10, described in greater detail below, the Belleville washer peripheral portion 12 of the diaphragm spring 11 bearing against the pressure plate 14.

The cover 10 has a radial flange 16 with flats or areas 15 for securement to a reaction plate or flywheel 17 which is shown in phantom lines in FIG. 2 and fixed for rotation with a first shaft, in practice a driving shaft (not shown); a driven disk or clutch plate 18 also shown in phantom lines in FIG. 2 is interposed between the reaction plate 17 and the pressure plate 14 and fixed for rotation with a second shaft, in practice a driven shaft (not shown). The clutch plate 18 and the reaction plate 17 are not part of the cover assembly.

For cooperation with the diaphragm spring 11 the pressure plate 14 has angularly spaced axial projections or bosses 20 against which bears the Belleville washer peripheral portion 12 of the diaphragm spring 11.

The pressure plate 14 has at its periphery angularly spaced, radially extending lugs 21, straps 23 arranged substantially tangentially to a circumference of the cover assembly are attached at one of their ends to the lugs and at the ohter of their ends to flat areas 22 on the cover 10. The straps 23 fix the pressure plate 14 for rotation with the cover 10 while permitting relative axial displacement.

The foregoing arrangements are known per se and will not be described in greater detail as they are not in themselves features of the present invention.

The cover 10 defines a first or primary fulcrum 25 for diaphragm spring 11, and more particularly for the Belleville washer peripheral portion 12, at the radially inner end of the Belleville washer peripheral portion. This first or primary fulcrum 25 comprises, in the illustrated embodiments, a V-shaped annular bead (see FIG. 3).

The assembly means rockably mounting the diaphragm spring 11 on the cover 10 comprises a fourth annular member of fulcrum ring 26. The fulcrum ring 26, which is attached to the cover by a plurality of connecting members 28 described in greater detail hereinbelow, is disposed on the side of the diaphragm spring remote from the cover 10, and provides a second or secondary fulcrum for the diaphragm spring 11. To this end, in the various illustrated embodiments, the fulcrum ring 26 has a V-shaped annular bead 27 in alignment with the annular bead 25 in the cover 10 and in contract with the Belleville washer peripheral portion 12 of the diaphragm spring 11.

According to the invention, the connecting members 28 which number nine in the embodiment of FIGS. 1-4, each comprise a boss 29 integral with a selected one of the fulcrum ring 26 and the cover 10 and axially projecting toward the nonselected one of the fulcrum ring and the cover.

In the FIG. 1-4 embodiment each connecting member comprises a single boss 29 integral with the cover 10 and projecting axially toward the fulcrum ring 26. The boss in this embodiment has a closed front wall 30 and defines a dimple. Such a boss may be formed by stamping.

The boss 29 is circumferentially elongated in radial section, and as best shown in FIG. 3, has two relatively close together walls 31 defining a V and as best shown in FIG. 4 the boss 29 has two walls 32 spaced from and generally parallel to each other. In the connecting zone of the boss 29 with the rest of the cover 10, the walls 31 of the boss 29 have in their middle regions depressions or notches 33 (FIG. 4).

Each of the bosses 29 thus formed in the cover 10 extends through apertures at the radially outer ends or roots of the radial fingers of the diaphragm spring to the other side of the diaphragm spring 11. An intermediate annular planar surface 37 of the fulcrum ring 26 bears axially against the front walls 30 of the bosses 29 and is secured thereto, for example, by welding or glueing.

Thus, as will be noted, the inner periphery of the fulcrum ring 26 is advantageously circularly continuous and in addition is rigidified by a slightly inclined annular lip 38 projecting away from the diaphragm spring 11.

The cover assembly may thus advantageously be assembled by simple axail stacking, whereupon the front walls 30 of the bosses 29 are spot-welded or glued to the fulcrum ring.

In the alternative embodiment of FIG. 5, each connecting member 28 comprises a boss 29' integral with and projecting axially from the fulcrum ring 26 toward the cover 10 otherwise in a manner similar to that described above. Each boss 29' extends axially through the diaphragm spring 11 and its front wall 30' bears against the cover 10 to which it is fixed by welding or glueing, the cover having a planar annular surface 37' for this purpose.

As will be noted the fulcrum ring 26 is circularly continuous along its inner periphery and rigidified by an inclined lip 38 as in the previous embodiment.

According to the embodiments illustrated in FIGS. 6 and 7, each of the connecting members 28 comprises two bosses 29, 29', a boss 29 emerging from the cover 10 toward the fulcrum ring 26 and a boss 29' emerging from the fulcrum ring 26 toward the cover 10. Each of the bosses 29, 29', as illustrated, defines a dimple.

The bosses 29, 29' of each connecting member 28 are in abutment along their respective front walls 30, 30'. They may be welded or glued together, as shown in FIG. 6, as discussed above.

Alternatively, as shown in FIG. 7, the bosses 29, 29' of each connecting member 28 are secured together by a stud 40, which may be a mere rivet as shown, which extends axially throught the front walls 30, 30'.

In the alternative embodiments of FIGS. 8-11, the bosses 29 formed in the cover 10 are tubular with internal apertures and comprise opened cylindrical walls parallel to the axis of the cover assembly.

In the embodiment of FIGS. 8 and 9, the fulcrum ring 26 also comprises tubular bosses 29' cooperable with respective tubular bosses 29. Pairs of bosses 29, 29' defining connecting members 28 are fitted inside each other. The boss 29' is fitted inside the boss 29 in the FIGS. 8 and 9 embodiment but it goes without saying that the opposite arrangement may be adopted.

In any event such bosses 29, 29' may be simply force-fitted inside each other. Alternatively, they may be fixed together by welding or glueing as schematically represented.

By greater or lesser insertion of the bosses 29' in the bosses 29 this arrangement provides for adjustment of the position of the fulcrum ring 26 relative to the cover 10.

In the embodiment of FIGS. 10 and 11, the fulcrum ring 26 has axially projecting studs 42 cooperable with and fitted in each boss 29. Preferably, the studs 42 are secured to the fulcrum ring 26 by riveting or upsetting prior to the cover assembly being assembled. Each stud 42 extends through a corresponding aperture 44 in the fulcrum ring 26 and is riveted to the latter by a head 43.

Such a stud 42 may be merely force-fitted into its associated tubular boss 29 or secured thereto by welding or glueing as above.

Alternatively, instead of the studs 42 being provided on the fulcrum ring 26 they may be on the cover 10, in which case tubular bosses are integral with the falcrum ring in cooperation with the studs.

In any event, the head 43 on such a stud 42 is accommodated in a depression in the corresponding annular member to minimize the effective axial length.

Moreover, the invention is not intended to be limited to the various illustrated and described embodiments but admits of all modifications and alternatives understood to those skilled in the art, without departing from the spirit and scope of the invention.

As will have been noted, in nearly all of the above embodiments the connecting members 28 are entirely axially disposed between the mean transverse planes of the cover and fulcrum ring. These mean transverse planes are schematically represented by phantom lines in FIG. 3, the mean transverse plane T being that of the cover 10 and the mean transverse plane T' being that of the fulcrum ring 26. These mean transverse planes T, T' extend through the middle of the generally planar portions perpendicular to the axis of the cover assembly in the respective annular members.

In the FIGS. 10-11 embodiment only the heads 43 of the studs 42 extend beyond the fulcrum ring 26. On the other hand there is nothing projecting from the other annular member, that is, the cover 10.

Further, the bosses 29 or 29' may be utilized for centering or locating the diaphragm spring. Alternatively, as shown in FIG. 12, for centering the diaphragm spring 11 at least one of the cover 10 and the fulcrum ring 25 may have at least one centering boss 45 extending through an aperture 35 in the diaphragm spring 11, the centering boss 45 having no interconnecting or securement function between the cover and the fulcrum ring.

The bosses provided according to the invention on the cover and/or the fulcrum ring are not necessarily provided at the time of manufacture and original assembly, but may be formed when a cover assembly is reconditioned.

Finally, the fulcrum ring is not necessary circularly continuous but may be divided into two or more arcuate segments or sectors.

What I claim is:

1. A diaphragm clutch cover assembly of the type including an annular cover for mounting on a reaction plate or flywheel, a diaphragm spring having a Belleville washer peripheral portion and divided by slots into radial fingers, means for rockably mounting said diaphragm spring on said cover, a pressure plate fixed for rotation with and axially movable relative to said cover, said Belleville washer peripheral portion bearing axially against said pressure plate, said means comprising a falcrum ring disposed on one side of said diaphragm spring axially remote from said cover, and a plurality of connecting members interconnecting said fulcrum ring and said cover, the improvement wherein said connecting members comprise bosses on at least a selected one of said cover and said fulcrum ring, said bosses projecting axially toward the nonselected one of said cover and said fulcrum ring, said nonselected one of said cover and said fulcrum ring having transverse surface portions facing axially toward said diaphragm spring, said bosses having transverse free end wall portions bearing axially against and fixed to said transverse surface portions.

2. The cover assembly of claim 1, wherein said bosses comprise dimples.

3. The cover assembly of claim 1, wherein said transverse surfaces are planar.

4. The cover assembly of claim 1, wherein said transverse free end wall portions of said bosses are bonded to said transverse surface portions.

5. The cover assembly of claim 1, wherein said bosses are stamped portions of the selected one of said cover and fulcrum ring.

6. The cover assembly of claim 1, wherein at least one of said bosses extends through an aperture in said diaphragm spring and defines means for centering said diaphragm spring.

7. The cover assembly of claim 1, further comprising an additional boss on one of said cover and fulcrum ring extending through an aperture in said diaphragm spring comprising means for centering said diaphragm spring.

8. The cover assembly of claim 1, wherein said connecting members are circumferentially elongated.

9. A diaphragm clutch cover assembly of the type including an annular cover for mounting on a reaction plate or flywheel, a diaphragm spring having a Belleville washer peripheral portion and a central portion divided by slots into radial fingers, assembly means for rockably mounting said diaphragm spring on said cover, a pressure plate fixed for rotation with and axially movable relative to said cover, said Belleville washer peripheral portion bearing axially against said pressure plate, said assembly means comprising a fulcrum ring disposed on one side of said diaphragm spring remote from said cover, fulcrum portions being provided on said fulcrum ring and said cover for engagement with the respective sides of said diaphragm spring, and a plurality of connecting members interconnecting said fulcrum ring and said cover, the improvement wherein said connecting members comprise aligned pairs of bosses on said cover and said fulcrum ring, said bosses on said cover projecting axially toward said fulcrum ring and said bosses on said fulcrum ring projecting axially toward said cover, the bosses of each of said aligned pairs of bosses bearing against and fixed to each other.

10. The cover assembly of claim 9, wherein aligned pairs of said first-mentioned bosses and said other bosses are bonded to one another along their transverse free end wall portions.

11. The cover assembly of claim 9, wherein aligned pairs of said first-mentioned bosses and said other bosses are riveted to one another through apertures in their transverse free end wall portions.

12. A diaphragm clutch cover assembly of the type including an annular cover for mounting on a reaction plate or flywheel, a diaphragm spring having a Belleville washer peripheral portion and a central portion divided by slots into radial fingers, assembly means for rockably mounting said diaphragm spring on said cover, a pressure plate fixed for rotation with and axially movable relative to said cover, said Belleville washer peripheral portion bearing axially against said pressure plate, said assembly means comprising a fulcrum ring disposed on one side of said diaphragm spring remote from said cover and a plurality of connecting members interconnecting said fulcrum ring and said cover, the improvement wherein said connecting members comprise bosses on at least a selected one of said cover and said fulcrum ring, said bosses projecting axially toward the nonselected one of said cover and fulcrum ring, said nonselected one of said cover and fulcrum ring comprising other bosses projecting axially toward the selected one of said cover and fulcrum ring and, wherein said first mentioned bosses are tubular with internal apertures, and aligned pairs of said first-mentioned bosses and said other bosses are fitted inside one another.

13. The cover assembly of claim 12, wherein said pairs of said first-mentioned bosses and other bosses are force-fitted inside one another.

14. The cover assembly of claim 12, wherein said pairs of said first-mentioned bosses and other bosses are bonded to one another.

15. A diaphragm clutch cover assembly of the type including an annular cover for mounting on a reaction plate or flywheel, a diaphragm spring having a Belleville washer peripheral portion and a central portion divided by slots into radial fingers, assembly means for rockably mounting said diaphragm spring on said cover, a pressure plate fixed for rotation with and axially movable relative to said cover, said Belleville washer peripheral portion bearing axially against said pressure plate, said assembly means comprising a fulcrum ring disposed on one side of said diaphragm spring remote from said cover and a plurality of connecting members interconnecting said fulcrum ring and said cover, the improvement wherein said connecting members comprise boses on at least a selected one of said cover and said fulcrum ring, said bosses projecting axially toward the nonselected one of said cover and said fulcrum ring, said bosses being tubular with internal apertures, and wherein said nonselected one of said cover and said fulcrum ring comprises studs axially projecting from said nonselected one of said cover and fulcrum ring and fitted inside associated said tubular bosses.

16. The cover assembly of claim 15, wherein said studs are upset or riveted to said nonselected one of said cover and fulcrum ring.

17. The cover assembly of claim 16, wherein said studs are force-fitted in their associated tubular bosses.

18. The cover assembly of claim 16, wherein said studs have external cylindrical walls and said tubular bosses have internal cylindrical walls, said studs being bonded to said bosses along their respective cylindrical walls.

19. A diaphragm clutch cover assembly of the type including an annular cover for mounting on a reaction plate or flywheel, a diaphragm spring having a Belleville washer peripheral portion and a central portion divided by slots into radial fingers, assembly means for rockably mounting said diaphragm spring on said cover, a pressure plate fixed for rotation with and axially movable relative to said cover, said Belleville washer peripheral portion bearing axially against said pressure plate, said assembly means comprising a fulcrum ring disposed on one side of said diaphragm spring remote from said cover and a plurality of connecting members interconnecting said fulcrum ring and said cover, the improvement wherein said connecting members comprise bosses on at least a selected one of said cover and said fulcrum ring, said bosses projecting axially toward the nonselected one of said cover and said fulcrum ring, said cover and said fulcrum ring both comprising planar portions having mean transverse planes, and wherein said connecting members are disposed entirely axially within a space defined by said mean transverse planes.

* * * * *